(12) United States Patent
Walmsley et al.

(10) Patent No.: US 7,057,758 B2
(45) Date of Patent: *Jun. 6, 2006

(54) COLOR PRINTER MODULE CONTROLLER

(75) Inventors: Simon Robert Walmsley, Balmain (AU); Paul Lapstun, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 357 days.

This patent is subject to a terminal disclaimer.

(21) Appl. No.: 10/636,202

(22) Filed: Aug. 8, 2003

(65) Prior Publication Data

US 2004/0027600 A1    Feb. 12, 2004

Related U.S. Application Data

(62) Division of application No. 09/575,119, filed on May 23, 2000, now Pat. No. 6,958,826.

(30) Foreign Application Priority Data

May 25, 1999  (AU) ..................... PQ0560

(51) Int. Cl.
G06F 13/00  (2006.01)
G06F 15/00  (2006.01)

(52) U.S. Cl. ..................... 358/1.15; 358/1.16
(58) Field of Classification Search ................ 358/1.15
See application file for complete search history.

(56) References Cited

U.S. PATENT DOCUMENTS

| | | | |
|---|---|---|---|
| 4,727,245 A | 2/1988 | Dobbins et al. | |
| 5,742,296 A * | 4/1998 | Yamada et al. | 345/604 |
| 5,806,997 A | 9/1998 | Kawanabe | |
| 5,914,737 A * | 6/1999 | Silverbrook | 347/48 |
| 6,039,430 A * | 3/2000 | Helterline et al. | 347/19 |
| 6,137,495 A * | 10/2000 | Gondek | 345/600 |
| 6,157,749 A * | 12/2000 | Miyake | 382/300 |
| 6,659,584 B1 * | 12/2003 | Miura et al. | 347/19 |

FOREIGN PATENT DOCUMENTS

| | | |
|---|---|---|
| EP | 0193726 A | 9/1986 |
| EP | 0734864 A1 | 2/1996 |
| EP | 978799 A2 | 2/2000 |
| WO | WO 92/10058 A2 | 6/1992 |

* cited by examiner

*Primary Examiner*—Edward L Coles
*Assistant Examiner*—Alan Rahimi

(57) ABSTRACT

A controller for a printer module having a printhead that prints an image on printable media including a low speed central processing unit with associated program memory storing program steps for execution by the central processing unit to operate the printer module and associated scratch memory to store program variables. An image to be printed is stored in an image storage memory of approximately 1.3Mbytes. An image access unit accesses the image and transfers the image to a printhead interface on command from the central processing unit. The printhead interface transforms the image to a 1600 dpi dither CMY image for printing by a monolithic printhead. The controller also includes one or more interface units communicating with components of said printer module under control of the central processing unit. A Serial Bus interface communicates with the Serial Bus of a compact printer system to transfer data and power between modules. In one application, a camera module captures an image, which is transferred to the image storage memory of the printer module for printing by the printhead.

16 Claims, 13 Drawing Sheets

COLOR PRINTER MODULE CONTROLLER

CROSS-REFERENCE TO RELATED APPLICATION

This is a Divisional Application of U.S. application Ser. No. 09/575,119, filed on May 23, 2000, now issued U.S. Pat. No. 6,958,826.

Reference may be had to co-pending applications claiming priority from Australian Provisional Patent Application number PQ0560 dated 25 May 1999. The co-pending applications describe related modules and methods for implementing the compact printer system. The co-pending applications are as follows:

| USSN | Title |
| --- | --- |
| 09/575,182 | Compact Color Printer Module |
| 09/575,173 | Modular Compact Printer System |
| 09/575,194 | Nozzle Capping Mechanism |
| 09/575,136 | Ink Cartridge for Compact Printer System |
| 09/575,135 | Camera Module for Compact Printer System |
| 09/575,157 | Image Processor for Camera Module |
| 09/575,166 | Memory Module for Compact Printer System |
| 09/575,134 | Effects Module for Compact Printer System |
| 09/575,121 | Effects Processor for Effects Module |
| 09/575,137 | Timer Module for Compact Printer System |
| 09/575,167 | Color Conversion Method for Compact Printer System |
| 09/575,120 | Method and Apparatus of Dithering |
| 09/575,122 | Method and Apparatus of Image Conversion |

BACKGROUND OF THE INVENTION

Microelectronic manufacturing techniques have led to the miniaturization of numerous devices. Mobile phones, personal digital assistant devices, and digital cameras are very common examples of the miniaturization trend.

One device that has not seen the advantage of microelectronic manufacturing techniques is the printer. Commercially available printers are large compared to many of the devices they could support. For instance, it is impractical to carry a color printer for the purpose of instantly printing photographs taken with known compact digital cameras.

A compact printhead has been described in co-pending United States patent applications filed simultaneously to the present application and hereby incorporated by cross reference:

| USSN | Title |
| --- | --- |
| 09/575,152 | Fluidic seal for an ink jet nozzle assembly |
| 09/575,141 | Ink jet printhead having a moving nozzle with an externally arranged actuator |
| 09/575,125 | Method of manufacture of an ink jet printhead having a moving nozzle with an externally arranged actuator |
| 09/575,176 | Ink jet printhead nozzle array |
| 09/575,147 | Nozzle guard for an ink jet printhead |

In order to construct a compact print module for a compact printer system it is necessary to address the problem of control of the printer and communication of the image to the printhead. Methods of very large scale integration and microelectronic manufacturing are known but have not been applied to the needs of a compact printer system. No suitable print controller exists for a compact color printer module.

SUMMARY OF THE INVENTION

In one form, the invention resides in a controller for a printer module having a printhead that prints an image on printable media, said controller comprising:
a central processing unit;
program memory associated with said central processing unit, said program memory storing program steps for execution by said central processing unit to operate said printer module to print said image;
one or more interface units communicating with components of said printer module; image storage memory storing said image in $L^*a^*b^*$ format; and
an image access unit in communication with said image storage memory, said central processing unit and a printhead interface, said image access unit accessing said image in said image storage memory, and transferring said image to said printhead interface on command from said central processing unit;
wherein said printhead interface includes a print generator, which converts said image from $L^*a^*b^*$ format to a dither CMY format, for printing by a printhead.

Further features of the invention will be evident from the following description.

BRIEF DESCRIPTION OF THE DRAWINGS

In order to assist with describing preferred embodiments of the invention, reference will be made to the following figures in which.

DETAILED DESCRIPTION OF THE PREFERRED EMBODIMENTS

Referring to FIGS. 1 to 12, there are shown various modules that together form a compact printer system. Individual modules can be attached and detached from the compact printer configuration to allow a user-definable solution to business-card sized printing. Images can also be transferred from one compact printer to another without the use of a secondary computer system. Modules have a minimal user-interface to allow straightforward interaction.

A compact printer system configuration consists of a number of compact printer modules connected together. Each compact printer module has a function that contributes to the overall functionality of the particular compact printer configuration. Each compact printer module is typically shaped like part of a pen, physically connecting with other compact printer modules to form the complete pen-shaped device. The length of the compact printer device depends on the number and type of compact printer modules connected. The functionality of a compact printer configuration depends on the compact printer modules in the given configuration.

The compact printer modules connect both physically and logically. The physical connection allows modules to be connected in any order, and the logical connection is taken care of by the compact printer Serial Bus—a bus that provides power, allows the modules to self configure and provides for the transfer of data.

In terms of physical connection, most compact printer modules consist of a central body, a male connector at one end, and a female connector at the other. Since most modules have both a male and female connector, the modules can typically be connected in any order. Certain modules only have a male or a female connector, but this is determined by the function of the module. Adaptor modules allow these single-connector modules to be connected at either end of a given compact printer configuration.

A four wire physical connection between all the compact printer modules provides the logical connection between them in the form of the compact printer Serial Bus. The compact printer Serial Bus provides power to each module, and provides the means by which data is transferred between modules. Importantly, the compact printer Serial Bus and accompanying protocol provides the means by which the compact printer system auto-configures, reducing the user-interface burden on the end-user.

Figure 2:
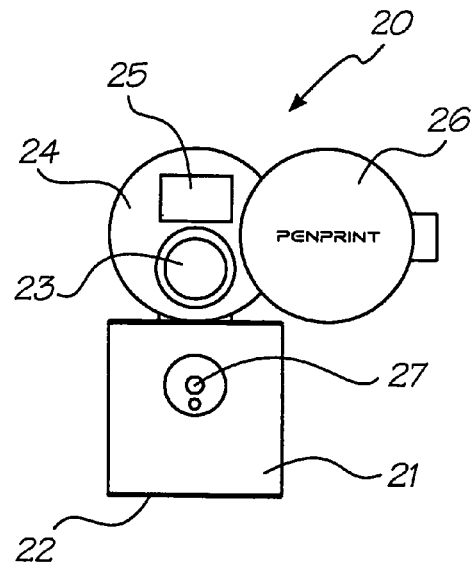
FIG. 2 is a camera module.
Figure 3:
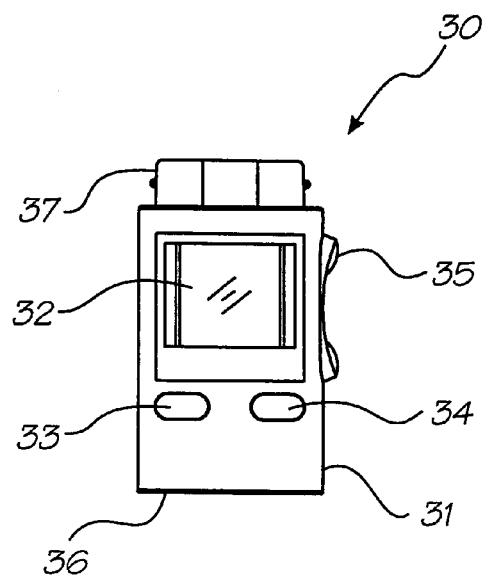
FIG. 3 is a memory module.
Figure 6:
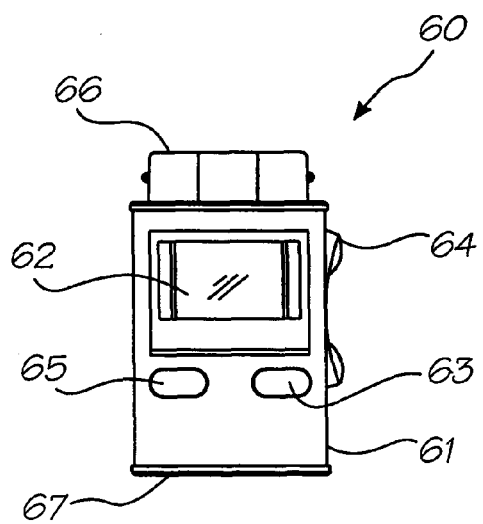
FIG. 6 is a timer module.
Figure 7:
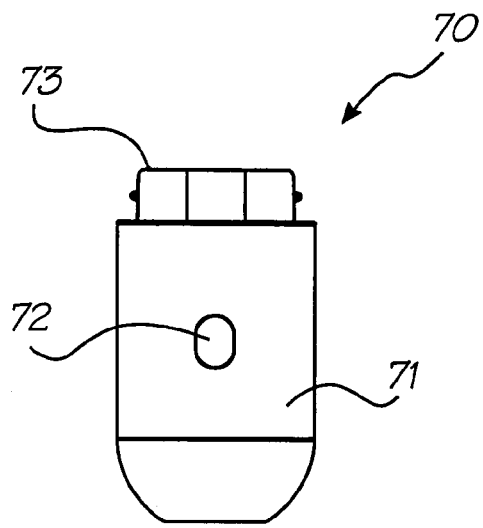
FIG. 7 is a laser module.

Compact printer modules can be grouped into three types:
image processing modules including a Printer Module (FIG. 1), a Camera Module (FIG. 2), and a Memory Module (FIG. 3). Image processing modules are primarily what sets the compact printer system apart from other pen-like devices. Image processing modules capture, print, store or manipulate photographic images;
housekeeping modules including an Adapter Module (FIG. 10), an Effects Module (FIG. 8), a Communications Module (FIG. 4), and a Timer Module (FIG. 6). Housekeeping modules provide services to other modules or extended functionality to other modules; and
isolated modules including a Pen Module (FIG. 11) and a Laser Module (FIG. 7). Isolated modules are those that attach to the compact printer system but are completely independent of any other module. They do not necessarily require power, and may even provide their own power. Isolated Modules are defined because the functionality they provide is typically incorporated into other pen-like devices.

Although housekeeping modules and isolated modules are useful components in a compact printer system, they are extras in a system dedicated to image processing and photographic manipulation. Life size (1:1) illustrations of the compact printer modules are shown in FIGS. 1 to 12, and example configurations produced by connecting various modules together are shown in FIGS. 13 to 16.

Figure 1:
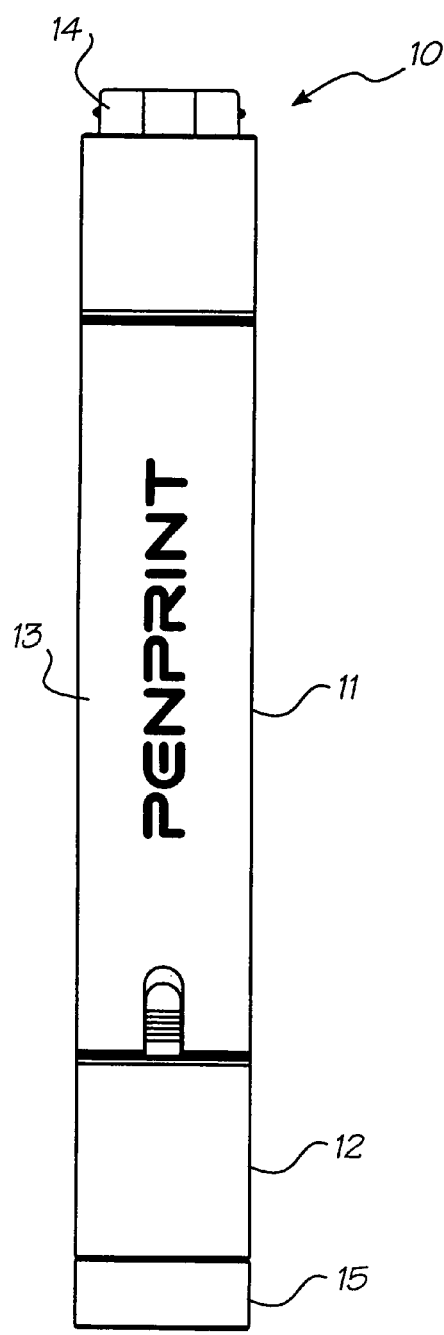
FIG. 1 is a printer module.

FIG. 1 shows a printer module that incorporates a compact printhead described in co-pending United States patent applications listed in the Background section of this application, incorporated herewith by reference, and referred to herewith as a Memjet printhead. The Memjet printhead is a drop-on-demand 1600 dpi inkjet printer that produces bi-level dots in up to 4 colors to produce a printed page of a particular width. Since the printhead prints dots at 1600 dpi, each dot is approximately 22.5 µm in diameter, and spaced 15.875 µm apart. Because the printing is bi-level, the input image should be dither or error-diffused for best results. Typically a Memjet printhead for a particular application is page-width. This enables the printhead to be stationary and allows the paper to move past the printhead. A Memjet printhead is composed of a number of identical ½ inch Memjet segments.

The printer module 10 comprises a body 11 housing the Memjet printhead. Power is supplied by a three volt battery housed in battery compartment 12. The printhead is activated to commence printing when a business card (or similar sized printable media) is inserted into slot 13. Male connector 14 and female connector 15 facilitate connection of other modules to the printer module 10.

FIG. 2 shows a camera module 20. The camera module provides a point-and-shoot camera component to the compact printer system as a means of capturing images. The camera module comprises a body 21 having a female connector 22. A lens 23 directs an image to an image sensor and specialized image processing chip within the camera 24. A conventional view finder 25 is provided as well as a lens cap 26. An image is captured when the Take button 27 is pushed. Captured images are transferred to the Printer Module 10 for subsequent printing, manipulation, or storage. The Camera Module also contains a self-timer mode similar to that found on regular cameras.

FIG. 3 shows a Memory Module 30 comprising a body 31, LCD 32, IN button 33, OUT button 34 and SELECT button 35. The Memory Module 30 is a standard module used for storing photographic images captured by the Camera 20. The memory module stores 48 images, each of which can be accessed either at full resolution or at thumbnail resolution. Full resolution provides read and write access to individual images, and thumbnail resolution provides read access to 16 images at once in thumbnail form.

The Memory Module 30 attaches to other modules via a female connector 36 or male connector 37. The male and female connectors allow the module to be connected at either end of a configuration. Power is provided from the Printer Module 10 via the Serial Bus.

Figure 4:
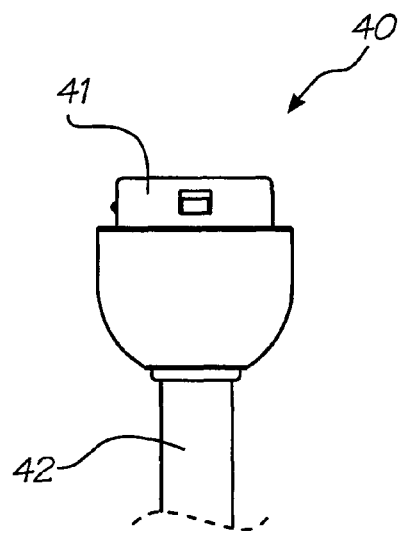
FIG. 4 is a communication module.

A Communications Module 40 is shown in FIG. 4. The communications module 40 consists of a connector 41 and a cable 42 that terminates in an appropriate connector for a computer port, such as a USB port, RS232 serial port or parallel port. The Communications Module 40 allows the compact printer system to be connected to a computer. When so connected, images can be transferred between the computer and the various modules of the compact printer system. The communications module allows captured images to be downloaded to the computer, and new images for printing to be uploaded into the printer module 10.

Figure 5:
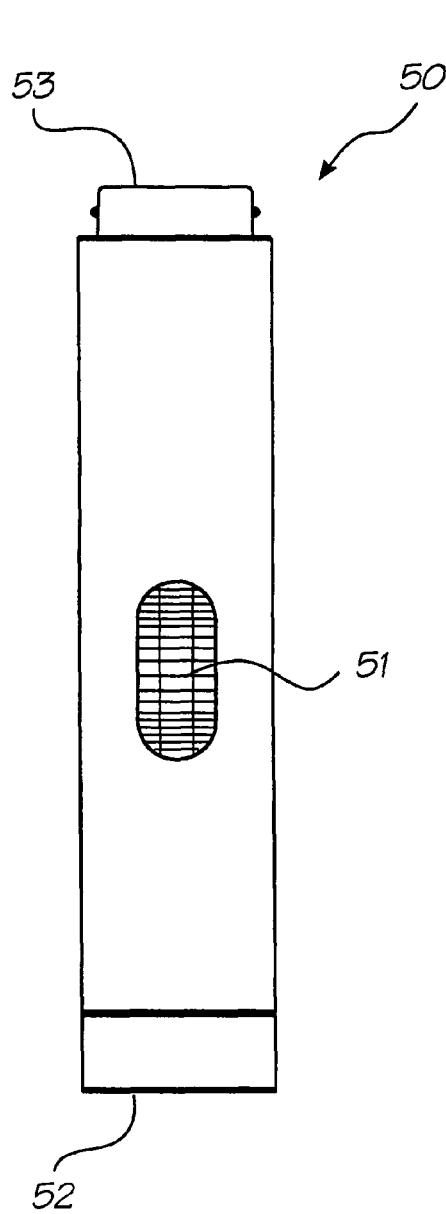
FIG. 5 is a flash module.

A Flash Module 50 is shown in FIG. 5. The Flash Module 50 is used to generate a flash with flash cell 51 when taking photographs with the Camera Module 20. The Flash Module attaches to other modules via female connector 52 and male connector 53. It contains its own power source. The Flash Module is automatically selected by the Camera Module when required. A simple switch allows the Flash Module to be explicitly turned off to maximize battery life.

FIG. 6 shows a Timer Module 60 that is used to automate the taking of multiple photos with the Camera Module 20, each photo separated by a specific time interval. The captured photos are stored in Memory Module 30. Any flash requirements are handled by the Camera Module 20, and can therefore be ignored by the Timer Module. The Timer Module 60 consists of a body 61 housing a LCD 62, START/STOP button 63 and UNITS button 64. A SELECT button 65 allows the user to select time units and the number of units are set by UNITS button 64. The Timer Module 60 includes a male connector 66 and female connector 67. The Timer Module takes its power from the Printer Module 10 via the Serial Bus.

A Laser Module 70 is shown in FIG. 7. The Laser Module 70 consists of a body 71 containing a conventional laser pointer operated by button 72. As the Laser Module is a terminal module it only has one connector, which in the example is a male connector 73. The Laser Module is an isolated module, in that it does not perform any image capture, storage, or processing. It exists as a functional addition to the compact printer system. It is provided because laser pointer services are typically incorporated into other pen-like devices. The Laser Module contains its own power supply and does not appear as a device on the Serial Bus.

Figure 8:
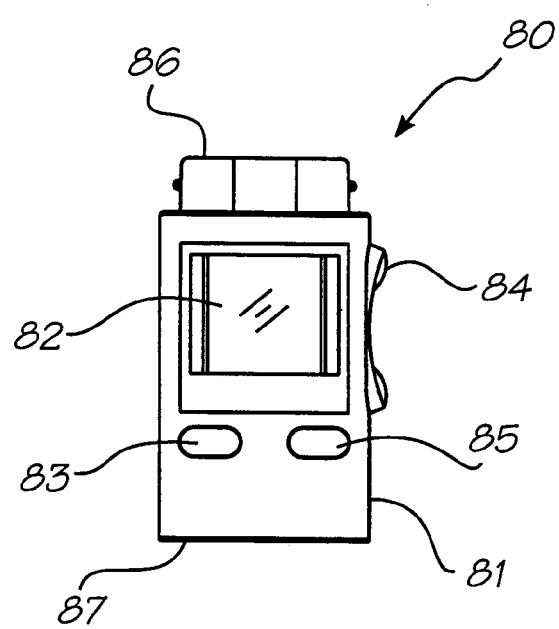
FIG. 8 is an effects module.

The Effects Module shown in FIG. 8 is an image processing module. It allows a user to select a number of effects and applies them to the current image stored in the Printer Module 10. The effects include borders, clip-art, captions, warps, color changes, and painting styles. The Effects Module comprises a body 81 housing custom electronics and a LCD 82. A CHOOSE button 83 allows a user to choose between a number of different types of effects. A SELECT button 84 allows the user to select one effect from the number of effects of the chosen type. Pressing the APPLY button 85 applies the effect to image stored in the Printer Module 10. The Effects Module obtains power from the Serial Bus. Male connector 86 and female connector 87 allow the Effects Module to be connected to other compact printer system modules.

Figure 9:
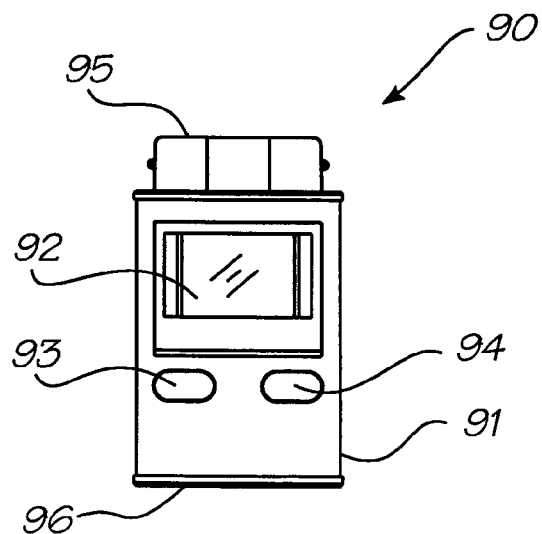
FIG. 9 is a characters module.

FIG. 9 shows a Character Module 90 that is a special type of Effects Module (described above) that only contains character clip-art effects of a given topic or genre. Examples include The Simpsons®, Star Wars®, Batman®, and Dilbert® as well as company specific modules for McDonalds® etc. As such it is an image processing module. It consists of a body 91 housing custom electronics and a LCD 92. SELECT button 93 allows the user to choose the effect that is to be applied with APPLY button 94. The Character Module obtains power from the Serial Bus through male connector 95 and female connector 96.

Figure 10:
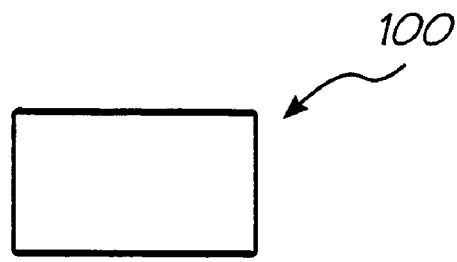
FIG. 10 is an adaptor module.

The Adaptor Module 100, shown in FIG. 10, is a female/female connector that allows connection between two modules that terminate in male connectors. A male/male connector (not shown) allows connection between two modules that terminate in female connectors. The Adaptor Module is a housekeeping module, in that it facilitates the use of other modules, and does not perform any specific processing of its own.

All "through" modules have a male connector at one end, and a female connector at the other end. The modules can therefore be chained together, with each module connected at either end of the chain. However some modules, such as the Laser Module 70, are terminating modules, and therefore have either a male or female connector only. Such single-connector modules can only be connected at one end of the chain. If two such modules are to be connected at the one time, an Adaptor Module 100 is required.

Figure 11:
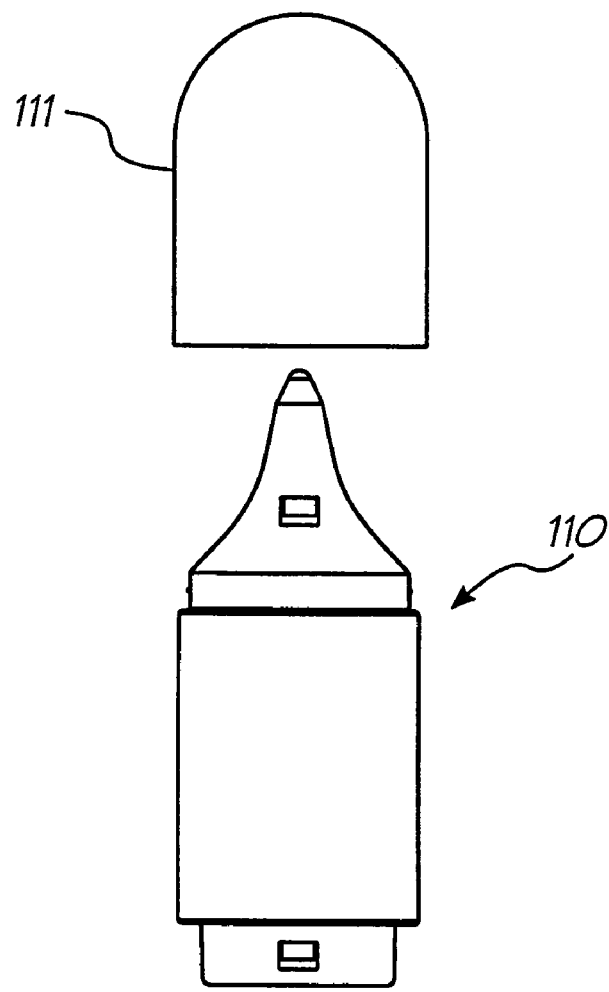
FIG. 11 is a pen module.

FIG. 11 shows a Pen Module 110 which is a pen in a module form. It is an isolated module in that it attaches to the compact printer system but is completely independent of any other module. It does not consume or require any power. The Pen Module is defined because it is a convenient extension of a pen shaped, pen sized device. It may also come with a cap 111. The cap may be used to keep terminating connectors clean in the case where the chain ends with a connector rather than a terminating module.

Figure 12:
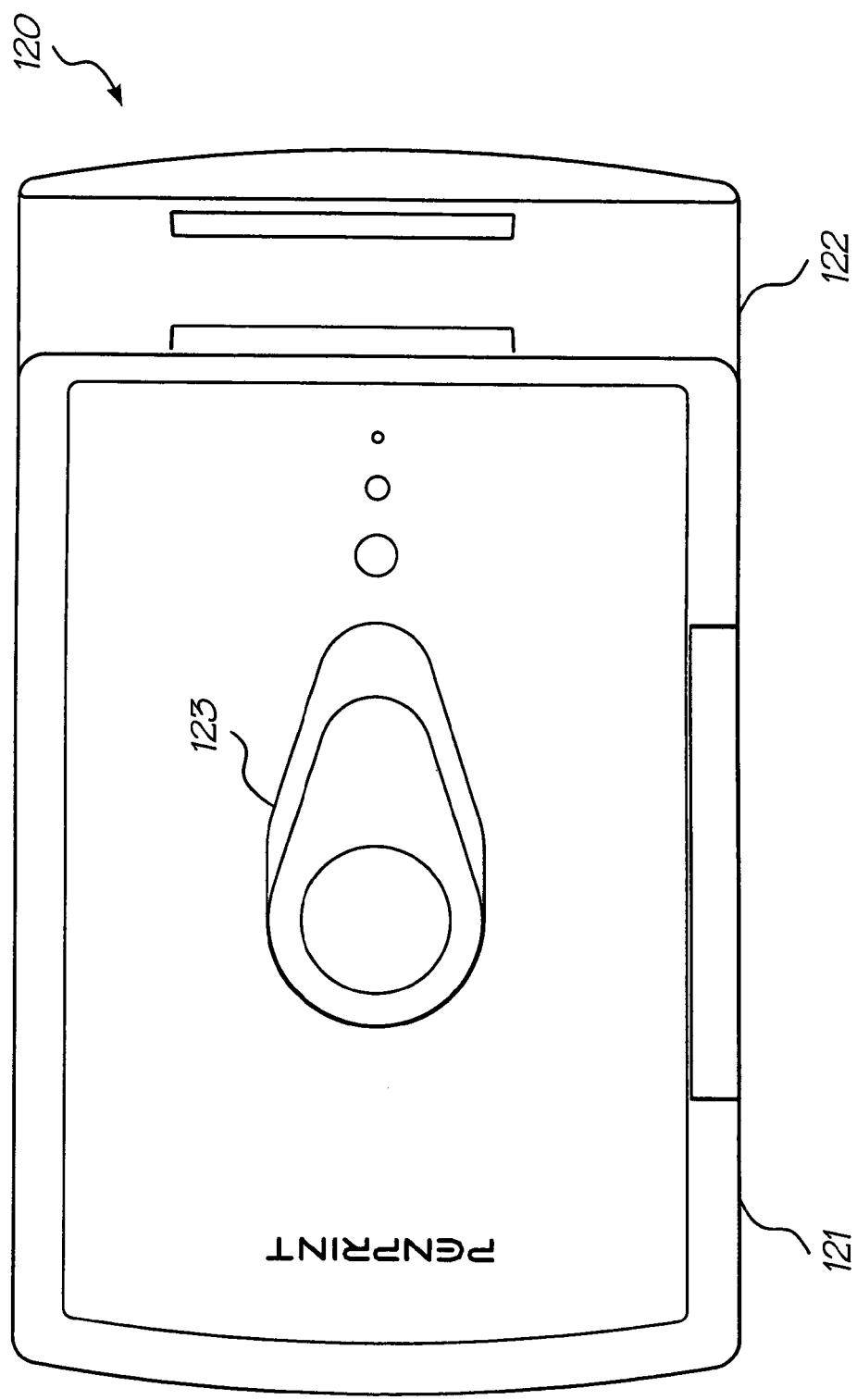
FIG. 12 is a dispenser module.

To assist with accurately feeding a business card sized print media into slot 13 of the printer module 10, a dispenser module 120 is provided as shown in FIG. 12. The dispenser module 120 comprises a body 121 that holds a store of business card sized print media. A Printer Module 10 locates into socket 122 on the dispenser module 120. When correctly aligned, a card dispensed from the dispenser module by slider 123 enters slot 13 and is printed.

In the sense that a minimum configuration compact printer system must be able to print out photos, a minimum compact printer configuration contains at least a Printer Module 10. The Printer Module holds a single photographic image that can be printed out via its Memjet printer. It also contains the 3V battery required to power the compact printer system.

Figure 13:
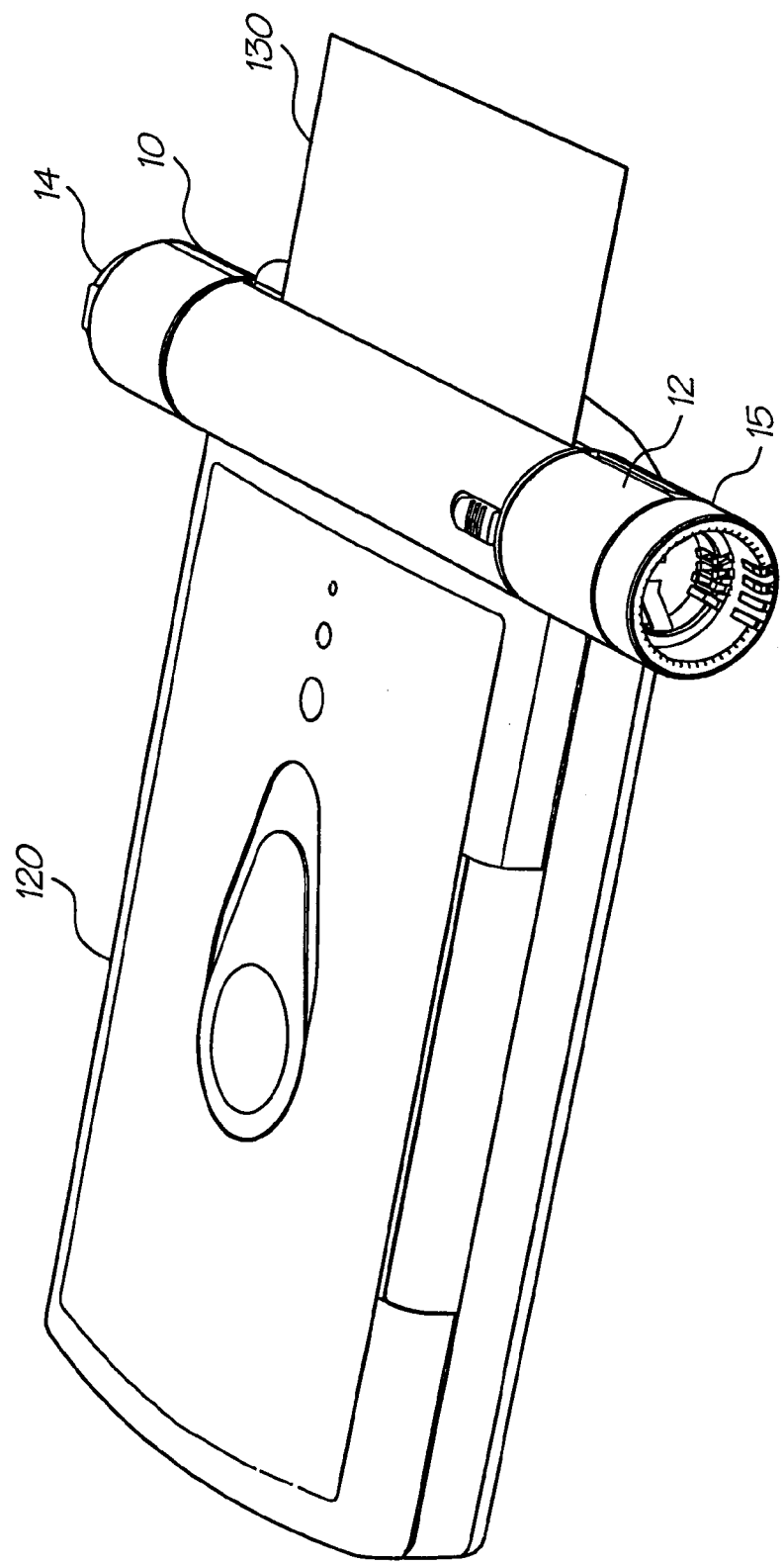
FIG. 13 is a first compact printer configuration.

In this minimum configuration, the user is only able to print out photos. Each time a user inserts a business card 130 into the slot in the Printer Module, the image in the Printer Module is printed onto the card. The same image is printed each time a business card is inserted into the printer. In this minimum configuration there is no way for a user to change the image that is printed. The dispenser module 120 can be used to feed cards 130 into the Printer Module with a minimum of fuss, as shown in FIG. 13.

Figure 14:
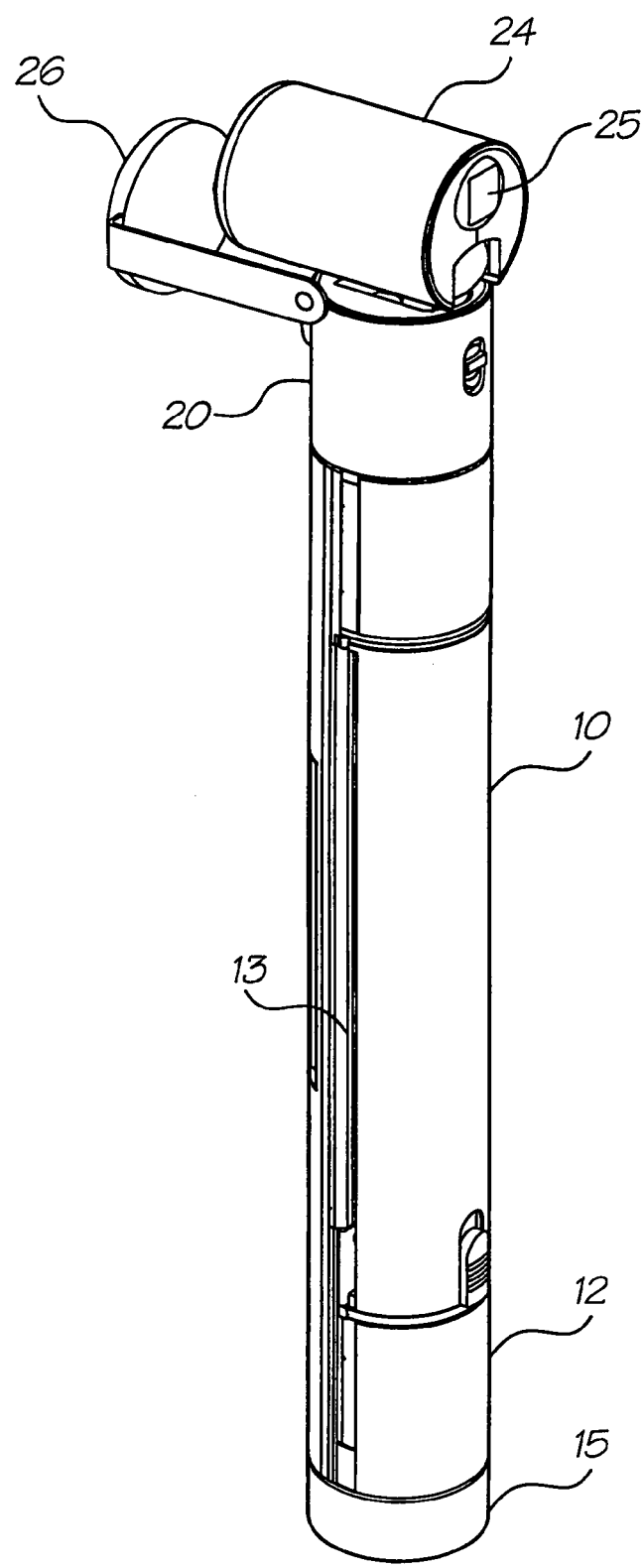
FIG. 14 is a second compact printer configuration.

By connecting a Camera Module 20 to the minimum configuration compact printer system the user now has an instant printing digital camera in a pen, as shown in FIG. 14. The Camera Module 20 provides the mechanism for capturing images and the Printer Module 10 provides the mechanism for printing them out. The battery in the Printer Module provides power for both the camera and the printer.

When the user presses the "Take" button 27 on the Camera Module 20, the image is captured by the camera 24 and transferred to the Printer Module 10. Each time a business card is inserted into the printer the captured image is printed out. If the user presses "Take" on the Camera Module again, the old image in the Printer Module is replaced by the new image.

If the Camera Module is subsequently detached from the compact printer system, the captured image remains in the Printer Module, and can be printed out as many times as desired. The Camera Module is simply there to capture images to be placed in the Printer Module.

Figure 15:
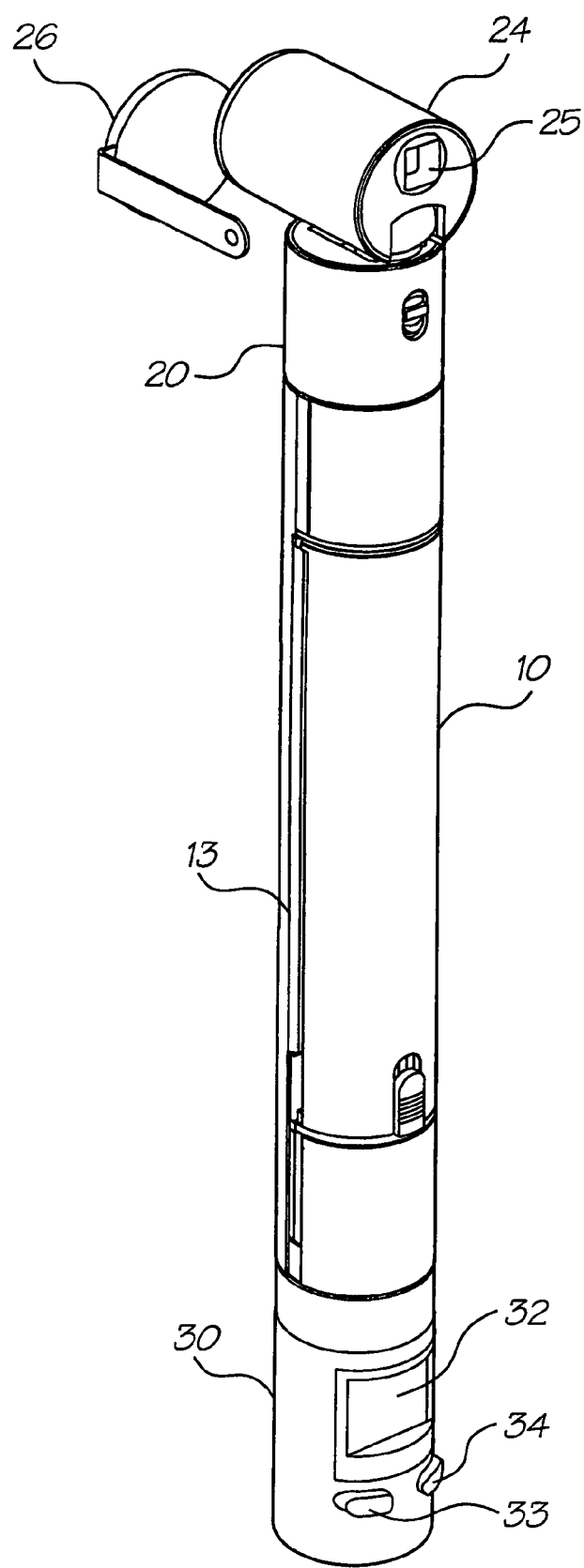
FIG. 15 is a third compact printer configuration.

FIG. 15 shows a further configuration in which a Memory Module 30 is connected to the configuration of FIG. 14. In the embodiment of FIG. 15, the user has the ability to transfer images between the Printer Module 10 and a storage area contained in the Memory Module 30. The user selects the image number on the Memory Module, and then either sends that image to the Printer Module (replacing whatever image was already stored there), or brings the current image from the Printer Module to the specified image number in the Memory Module. The Memory Module also provides a way of sending sets of thumbnail images to the Printer Module.

Multiple Memory Modules can be included in a given system, extending the number of images that can be stored. A given Memory Module can be disconnected from one compact printer system and connected to another for subsequent image printing.

With the Camera Module 20 attached to a Memory Module/Printer Module compact printer system, as shown in FIG. 15, the user can "Take" an image with the Camera Module, then transfer it to the specified image number in the Memory Module. The captured images can then be printed out in any order.

Figure 16:
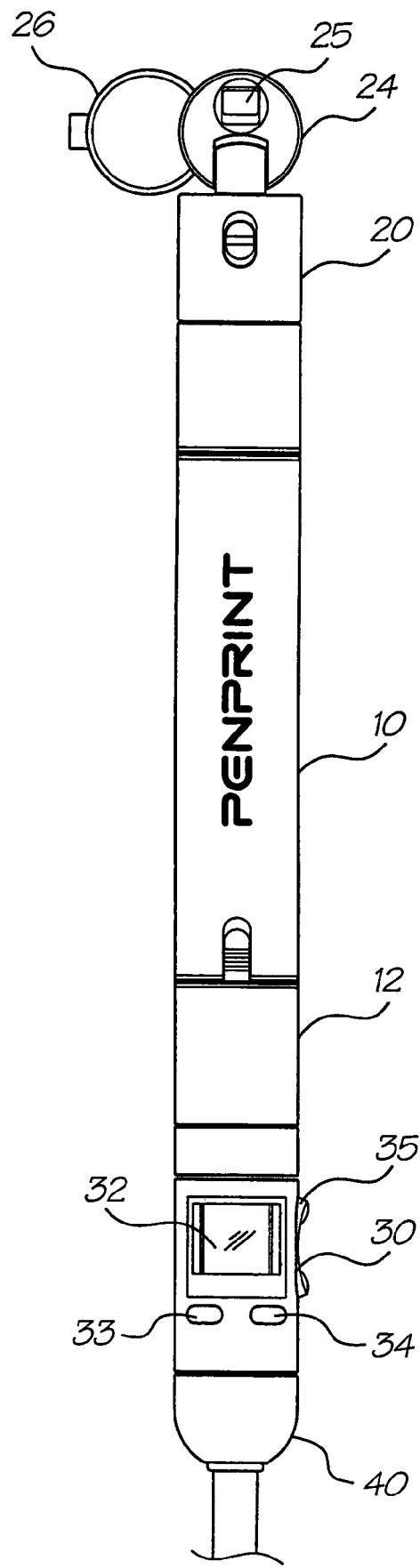
FIG. 16 is a fourth compact printer configuration.

By connecting a Communications Module 40 to the minimum configuration compact printer system, the user gains the ability to transfer images between a PC and the compact printer system. FIG. 16 shows the configuration of FIG. 15 with the addition of a Communications Module 40. The Communications Module makes the Printer Module 10 and any Memory Modules 30 visible to an external computer system. This allows the download or uploading of images. The communications module also allows computer control of any connected compact printer modules, such as the Camera Module 20.

In the general case, the Printer Module holds the "current" image, and the other modules function with respect to this central repository of the current image. The Printer Module is therefore the central location for image interchange in the compact printer system, and the Printer Module provides a service to other modules as specified by user interaction.

A given module may act as an image source. It therefore has the ability to transfer an image to the Printer Module. A different module may act as an image store. It therefore has the ability to read the image from the Printer Module. Some modules act as both image store and image source. These modules can both read images from and write images to the Printer Module's current image.

The standard image type has a single conceptual definition. The image definition is derived from the physical attributes of the printhead used in the Printer Module. The printhead is 2 inches wide and prints at 1600 dpi in cyan, magenta and yellow bi-level dots. Consequently a printed image from the compact printer system is 3200 bi-level dots wide.

The compact printer system prints on business card sized pages (85 mm×55 mm). Since the printhead is 2 inches wide, the business cards are printed such that 1 line of dots is 2 inches. 2 inches is 50.8 mm, leaving a 2 mm edge on a standard business-card sized page. The length of the image is derived from the same card size with a 2 mm edge. Consequently the printed image length is 81 mm, which equals 5100 1600 dpi dots. The printed area of a page is therefore 81 mm×51 mm, or 5100×3200 dots.

To obtain an integral contone to bi-level ratio a contone resolution of 267 ppi (pixels per inch) is chosen. This yields a contone CMY page size of 850×534, and a contone to bi-level ratio of 1:6 in each dimension. This ratio of 1:6 provides no perceived loss of quality since the output image is bi-level.

The printhead prints dots in cyan, magenta, and yellow ink. The final output to the printed page must therefore be in the gamut of the printhead and take the attributes of the inks into account. It would at first seem reasonable to use the CMY color space to represent images. However, the printer's CMY color space does not have a linear response. This is definitely true of pigmented inks, and partially true for dye-based inks. The individual color profile of a particular device (input and output) can vary considerably. Image capture devices (such as digital cameras) typically work in RGB (red green blue) color space, and each sensor will have its own color response characteristics.

Consequently, to allow for accurate conversion, as well as to allow for future image sensors, inks, and printers, the CIE L*a*b* color model [CIE, 1986, CIE 15.2 Colorimetry: Technical Report ($2^{nd}$ Edition), Commission Internationale De l'Eclairage] is used for the compact printer system. L*a*b* is well defined, perceptually linear, and is a superset of other traditional color spaces (such as CMY, RGB, and HSV).

The Printer Module must therefore be capable of converting L*a*b* images to the particular peculiarities of its CMY color space. However, since the compact printer system allows for connectivity to PCs, it is quite reasonable to also allow highly accurate color matching between screen and printer to be performed on the PC. However the printer driver or PC program must output L*a*b*.

Each pixel of a compact printer image is therefore represented by 24 bits: 8 bits each of L*, a*, and b*. The total image size is therefore 1,361,700 bytes (850×534×3).

Each image processing module is able to access the image stored in the Printer Module. The access is either to read the image from the Printer Module, or to write a new image to the Printer Module.

The communications protocol for image access to the Printer Module provides a choice of internal image organization. Images can be accessed either as 850×534 or as 534×850. They can also be accessed in interleaved or planar format. When accessed as interleaved, each pixel in the image is read or written as 24 bits: 8 bits each of L*, a*, b*. When accessed as planar, each of the color planes can be read or written independently. The entire image of L* pixels, a* pixels or b* pixels can be read or written at a time.

Figure 17:
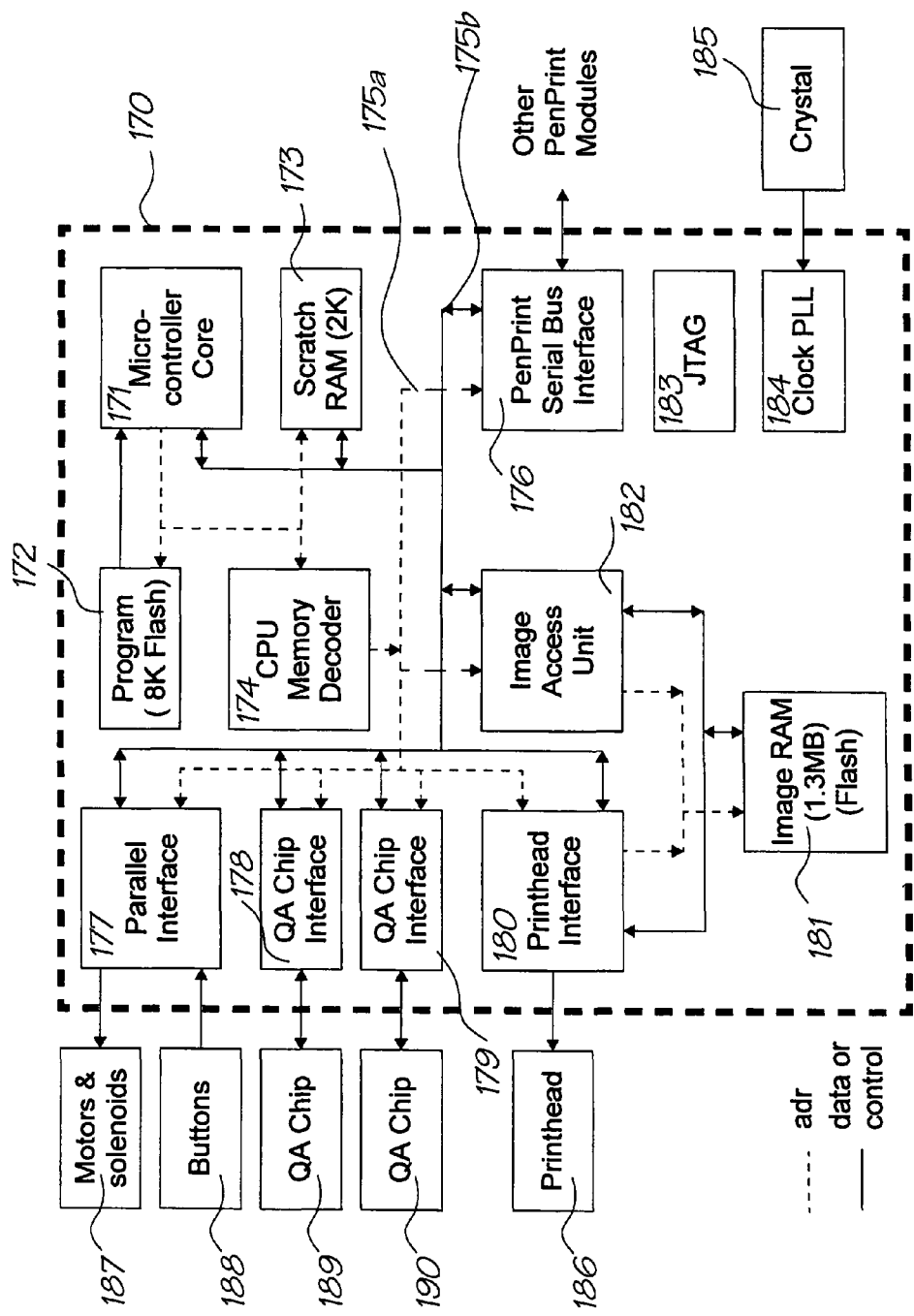
FIG. 17 is a block diagram of a controller for the printer module of FIG. 1.

To provide the required control functions and image processing the print module 10 includes an application specific integrated circuit configured as a printer controller. A block schematic of the controller is shown in FIG. 17. Each element of the controller is described in detail below together with examples of operation of the elements. The controller is designed to be fabricated using a 0.25 micron CMOS process, with approximately 9 million transistors, almost half of which are flash memory or static RAM. This leads to an estimated area of 16 mm². The controller contains:

a CPU/microcontroller core;
  program storage memory, which is suitably 8 Kbytes of flash memory;
  program variable storage, which is suitably 2 KByte of RAM;
  a parallel interface;
  an Image Access Unit and associated image storage memory; and
  a Printhead Interface.

The controller may also include a number of housekeeping and administration elements including;
  a Serial Bus Interface;
  2 QA Chip interfaces;
  a joint test action group (JTAG) interface;
  a clock; and
  a memory decoder.

The controller is intended to run at a clock speed of approximately 48 MHz on 3V externally and 1.5V internally to minimize power consumption. The actual operating frequency will be an integer multiple of the Serial Bus operating frequency. The CPU is intended to be a simple micro-controller style CPU, running at about 1 MHz, and can be a vendor supplied core.

Referring to FIG. 17 the controller 170 incorporates a simple micro-controller CPU core 171 to synchronize the image capture and printing image processing chains and to perform general operating system duties including the user-interface. A wide variety of CPU cores are suitable, it can be any processor core with sufficient processing power to perform the required calculations and control functions fast enough to meet consumer expectations.

Since all of the image processing is performed by dedicated hardware, the CPU does not have to process pixels. As a result, the CPU can be extremely simple. However it must be fast enough to run a stepper motor to advance the card during a print (the stepper motor requires a 5 KHz process). An example of a suitable core is a Philips 8051 microcontroller running at about 1 MHz.

Associated with the CPU Core 171 is a Program ROM 172 and a small Program Scratch RAM 173. The CPU 171 communicates with the other units within the controller via memory-mapped I/O supported by a Memory Decoder 174. Particular address ranges map to particular units, and within each range, to particular registers within that particular unit. This includes the serial and parallel interfaces.

The CPU Memory Decoder 174 is a simple decoder for satisfying CPU data accesses. The Decoder translates data addresses into internal controller register accesses over the internal low speed bus 175, and therefore allows for memory mapped I/O of controller registers. The bus 175 includes address lines 175a and data or control lines 175b.

The small Program Flash ROM 172 is incorporated into the controller to store simple sequences for controlling the stepper motor and other functions (expanded below). The ROM size depends on the CPU chosen, but should not be more than 8 Kbytes.

Likewise, a small scratch RAM 173 is incorporated into the controller for, primarily, program variable storage. Since the program code does not have to manipulate images, there is no need for a large scratch area. The RAM size depends on the CPU chosen (e.g. stack mechanisms, subroutine calling conventions, register sizes etc.), but should not be more than about 2 Kbytes The optional Serial Bus interface 176, is connected to the internal chip low-speed bus 175. The Serial Bus is controlled by the CPU 171 and preferably follows the USB protocol, although other protocols may be suitable. The Serial Bus is described in a co-pending application referred to above. The Serial Bus interface 176 allows the transfer of images to and from the Printer Module 10, by external control from the camera module 20, memory module 30, effects module 80, other modules or a computer. For example, the memory module 30 sends and receives images using the USB protocol on the Serial Bus.

The parallel interface 177 connects the controller to individual static electrical signals. The CPU 171 is able to control each of these connections as memory-mapped I/O via the low-speed bus 175. The following table shows the connections to the parallel interface.

| Connections to Parallel Interface | | |
|---|---|---|
| Connection | Direction | Pins |
| Paper transport stepper motor | Out | 4 |
| Nozzle capping solenoid (optional) | Out | 1 |
| Buttons | In | 2 |

As indicated in the table, the parallel interface 177 provides communication to a stepper motor 187 in the printer module 10 and can receive signals from buttons 188 (such as a paper sensor to detect the presence of printable media in the printer module).

There are two optional low-speed serial interfaces 178, 179 connected to the internal low-speed bus 175. A first interface 178 connects to a QA chip 189 in the ink cartridge of the printer module 10. The second interface connects to a QA chip 190 on the print module 10. The reason for having two interfaces is to connect to both the on-module QA Chip 190 and to the ink cartridge QA Chip 189 using separate lines. The two QA chips are implemented as Authentication Chips. If only a single line is used, a clone ink cartridge manufacturer could usurp the authentication mechanism and provide a non-proprietary cartridge.

A CPU-mediated protocol between the two QA chips is used to authenticate the ink cartridge. The controller can then retrieve ink characteristics from the ink cartridge QA chip, as well as the remaining volume of each color ink. The controller uses the ink characteristics to properly configure the printhead 186. It uses the remaining ink volumes, updated on a page-by-page basis with ink consumption information accumulated by the Printhead Interface 180, to ensure that it never allows the printhead to be damaged by running dry.

The Image Storage Memory 181 is used to store the current print image. It is suitably multi-level Flash RAM (2-bits per cell) so that the image is retained after the power has been shut off. It is referred to as ImageRAM for convenience. The image held in ImageRAM is kept in an interleaved format (the color components for a given pixel are stored together). Images are stored in one of two formats: either as CMY or L*a*b*, with each image represented by 850 lines containing 534 sets of 3 8-bit color samples each.

The total amount of memory required for the interleaved linear CMY/L*a*b* image is 1,361,700 bytes (approximately 1.3 MB). The image is written to ImageRAM by the Image Access Unit 182, and read by both the Image Access Unit 182 and the Print Generator Unit 193 of the printhead interface 180. The CPU does not have direct random access to this image memory. It must access the image pixels via the Image Access Unit 182.

The Image Access Unit (IAU) 182 is the means for the controller to access the image in ImageRAM 181. The controller can read pixels from the image in the image storage memory and write pixels back. The IAU allows planar and interleaved access. It also allows for 90 degrees rotation.

Pixels are read by the controller when the image is to be transferred to another Module. Pixels are written by the controller when the image is being loaded from another Module. The registers of the IAU allow pixel transfers to be planar, interleaved or rotated by 90 degrees as desired.

The Image Access Unit 182 is a straightforward access mechanism to ImageRAM 181, and operates via the register set as shown in the following table.

| IAU Registers | | |
|---|---|---|
| Name | Bits | Description |
| ImageAddress | 21 | Address to read or write in ImageRAM |
| Delta12 | 12 | Amount to add to ImageAddress when stepping from one pixel to the next in reads/writes for the first 2 of each set of 3. |
| Delta3 | 12 | Amount to add to ImageAddress when stepping from one pixel to the next in reads/writes during the 3rd access of each set of 3. |
| Mode | 3 | 0 = Read from ImageAddress into Value. 1 = Write Value to ImageAddress. |
| Value | 8 | Value stored at ImageAddress (if Mode = Read) Value to store at ImageAddress (if Mode = Write) |

The data is read from or written to the appropriate address in Image RAM whenever the Value register is read from or written to, according to the sense of Mode. Interleaved/planar and rotated access is accomplished via the two Delta registers. The values are set as shown in the following table.

Register Settings for Different Image Access Modes

| Access Type | Image Read or Written as | Image Address | Delta12 | Delta3 |
|---|---|---|---|---|
| Interleaved (each pixel 3 colors) | 850 rows × 534 pixels | 0 | 1 | 1 |
| | 534 rows × 850 pixels | 0 | 1 | 1600[a] |
| Planar - plane N (each pixel 1 color) | 850 rows × 534 pixels | N | 3 | 3 |
| | 534 rows × 850 pixels | N | 1602[b] | 1602 |

[a]534 × 3 − 2
[b]534 × 2

The controller 170 may also include a clock phase-locked loop 184 that provides timing signals to the controller. The clock 184 draws a base signal from crystal oscillator 185. Some CPU include a clock so the clock 184 and crystal 185 would not be required.

A standard JTAG (Joint Test Action Group) Interface 183 is included in the controller for testing purposes. Due to the complexity of the controller, a variety of testing techniques are required, including BIST (Built In Self Test) and functional block isolation. An overhead of 10% in chip area is assumed for overall chip testing circuitry.

The Printhead Interface (PHI) 180 is the means by which the controller loads the printhead 186 with the dots to be printed, and controls the actual dot printing process. The following description describes one implementation of a method of converting the image stored in ImageRam to image printed on a card.

Figure 18:
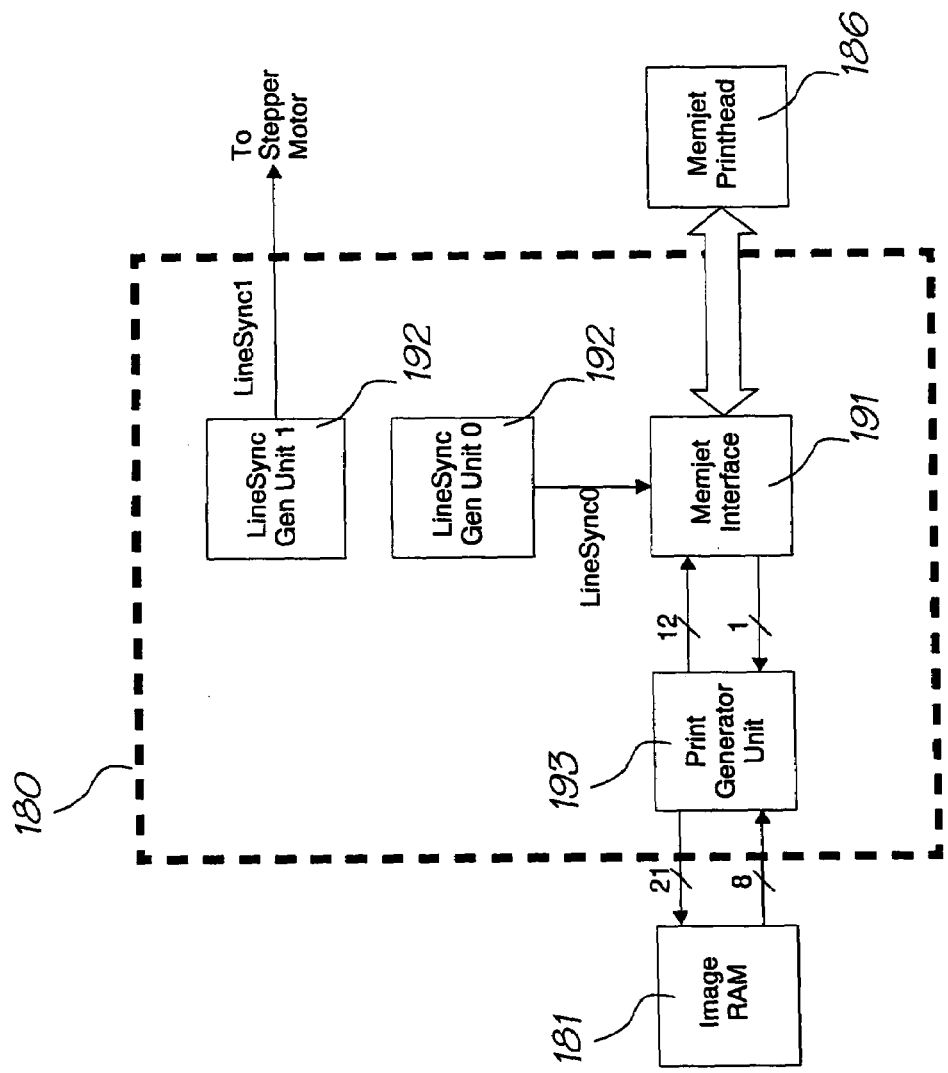
FIG. 18 is a schematic block diagram of a printhead interface.

The Printhead Interface 180 is a wrapper for a number of units as shown in FIG. 18, including:

- a Memjet Interface (MJI) 191, which transfers data to the Memjet printhead 186, and controls the nozzle firing sequences during a print;
- a pair of Line Synchronization Generator units (LSGU) 192, which provide synchronization signals for the MJI 191 and the stepper motors 187; and
- a Print Generator Unit (PGU) 193 which takes an image from the ImageRAM 181 (in L*a*b* or CMY) and produces a 1600 dpi dither CMY image in real time as required by the Memjet Interface 191. In addition, the PGU has a Test Pattern mode, which enables the CPU 171 to specify precisely which nozzles are fired during a print.

The units within the PHI are controlled by a number of registers that are programmed by the CPU 171.

In the PHI 180 there are two LSGUs 192. The first LSGU 192a produces LineSync0, which is used to control the Memjet Interface 191. The second LSGU 192b produces LineSync1 which is used to pulse the paper drive stepper motor 187.

The LineSyncGen units 192 are responsible for generating the synchronization pulses required for printing a page. Each LSGU produces an external LineSync signal to enable line synchronization. The generator inside the LGSU generates a LineSync pulse when told to 'go', and then every so many cycles until told to stop. The LineSync pulse defines the start of the next line.

The exact number of cycles between LineSync pulses is determined by the CyclesBetweenPulses register, one per generator. It must be at least long enough to allow one line to print (200 ms for the low speed printing) and another line to load, but can be longer as desired (for example, to accommodate special requirements of paper transport circuitry). If the CyclesBetweenPulses register is set to a number less than a line print time, the page will not print properly since each LineSync pulse will arrive before the particular line has finished printing.

The following table shows the interface registers contained in the LSGU:

LineSyncGen Unit Registers

| Register Name | Description |
|---|---|
| CyclesBetweenPulses | The number of cycles to wait between generating one LineSync pulse and the next. |
| Go | Controls whether the LSGU is currently generating LineSync pulses or not. A write of 1 to this register generates a LineSync pulse, transfers CyclesBetweenPulses to CyclesRemaining, and starts the countdown. When CyclesRemaining hits 0, another LineSync pulse is generated, CyclesBetweenPulses is transferred to CyclesRemaining and the countdown is started again. A write of 0 to this register stops the countdown and no more LineSync pulses are generated. |
| CyclesRemaining | A status register containing the number of cycles remaining until the next LineSync pulse is generated. |

The Memjet Interface (MJI) 191 connects the controller 170 to the Memjet printhead 186, providing both data and appropriate signals to control the nozzle loading and firing sequences during a print.

The Memjet Interface 191 is a state machine which follows the printhead. loading and firing order described, and includes the functionality of a preheat cycle and a cleaning cycle. The MJI 191 loads data into the printhead from a choice of two data sources:

All 1s. This means that all nozzles will fire during a subsequent print cycle, and is the standard mechanism for loading the printhead for a preheat or cleaning cycle;

From a 12-bit input held in a transfer register of the PGU 193. This is the standard means of printing an image, whether it is a photo or test pattern. The 12-bit value from the PGU is directly sent to the printhead and a 1-bit 'Advance' control pulse is sent to the PGU.

The MJI 191 knows how many lines it has to print for the page. When the MJI is told to 'go', it waits for a LineSync pulse before it starts the first line. Once it has finished loading/printing a line, it waits until the next LineSync pulse before starting the next line. The MJI stops once the specified number of lines has been loaded and/or printed, and ignores any further LineSync pulses.

The MJI is started after the PGU has already prepared the first 12-bit transfer value. This is so the 12-bit data input will be valid for the first transfer to the printhead. The MJI is therefore directly connected to the PGU, LineSync0, and the external Memjet printhead.

The following table shows the connections between the MJI 191 and the Memjet printhead 186.

| Printhead Connections | | | |
|---|---|---|---|
| Name | #Pins | I/O | Description |
| ChromapodSelect | 4 | O | Select which chromapod will fire (0–9) |
| NozzleSelect | 4 | O | Select which nozzle from the pod will fire (0–9) |
| Aenable | 1 | O | Firing pulse for phasegroup A |
| Benable | 1 | O | Firing pulse for phasegroup B |
| CDataIn[0–3] | 4 | O | Cyan output to cyan shift register of segments 0–3 |
| MDataIn[0–3] | 4 | O | Magenta input to magenta shift register of segments 0–3 |
| YDataIn[0–3] | 4 | O | Yellow input to yellow shift register of segments 0–3 |
| SRClock | 1 | O | A pulse on SRClock (ShiftRegisterClock) loads the current values from CDataIn[0–3], MDataIn[0–3] and YDataIn[0–3] into the 12 shift registers of the printhead |
| Ptransfer | 1 | O | Parallel transfer of data from the shift registers to the printhead's internal NozzleEnable bits (one per nozzle). |
| SenseSegSelect | 1 | O | A pulse on SenseSegSelect ANDed with data on CDataIn[n] selects the sense lines for segment n. |
| Tsense | 1 | I | Temperature sense |
| Vsense | 1 | I | Voltage sense |
| Rsense | 1 | I | Resistivity sense |
| Wsense | 1 | I | Width sense |

The duration of firing pulses on the AEnable and BEnable lines depend on the viscosity of the ink (which is dependent on temperature and ink characteristics) and the amount of power available to the printhead. The typical pulse duration range is 1.3 to 1.8 ms. The MJI therefore contains a programmable pulse duration table, indexed by feedback from the printhead. The table of pulse durations allows the use of a lower cost power supply, and aids in maintaining more accurate drop ejection.

The Pulse Duration table has 256 entries, and is indexed by the current Vsense and Tsense settings. The upper 4-bits of address come from Vsense, and the lower 4-bits of address come from Tsense. Each entry is 8 bits, and represents a fixed point value in the range of 0–4 ms.

The 256-byte table is written by the CPU 171 before printing the image. Each 8-bit pulse duration entry in the table combines:

Brightness settings
Viscosity curve of ink (from the ink cartridge QA Chip189)
Rsense
Wsense
Tsense
Vsense The MJI maintains a count of the number of dots of each color fired from the printhead. The dot count for each color is a 24-bit value, individually cleared under processor control. Each dot count can hold a maximum coverage dot count of a single 3-inch print, so in typical usage, the dot count will be read and cleared after each print.

The dot counts are used by the CPU to update the QA chip in order to predict when the ink cartridge will run out of ink. The processor knows the volume of ink in the cartridge for each of C, M, and Y from the QA chip. Counting the number of drops eliminates the need for ink sensors, and prevents the ink channels from running dry. An updated drop count is written to the QA chip after each print. A new image will not be printed unless there is enough ink left, and allows the user to change the ink without getting a dud photo that must be reprinted.

The CPU communicates with the MJI via a register set. The registers allow the CPU to parameterize a print as well as receive feedback about print progress. The following registers are contained in the MJI:

| Memjet Interface Registers | |
|---|---|
| Register Name | Description |
| Print Parameters | |
| NumTransfers | The number of transfers required to load the printhead (usually 800). This is the number of pulses on the SRClock and the number of 12-bit data values to transfer for a given line. |
| NumLines | The number of Load/Print cycles to perform. |
| Monitoring the Print | |
| Status | The Memjet Interface's Status Register |
| LinesRemaining | The number of lines remaining to be printed. Only valid while Go = 1. Starting value is NumLines and counts down to 0. |
| TransfersRemaining | The number of transfers remaining before the Printhead is considered loaded for the current line. Only valid while Go = 1. Starting value is NumTransfers and counts down to 0. |
| SenseSegment | The 4-bit value to place on the Cyan data lines during a subsequent feedback SenseSegSelect pulse. Only 1 of the 4 bits should be set, corresponding to one of the 4 segments. |
| SetAllNozzles | If non-zero, the 12-bit value written to the printhead during the LoadDots process is all 1s, so that all nozzles will be fired during the subsequent PrintDots process. This is used during the preheat and cleaning cycles. If 0, the 12-bit value written to the printhead comes from the Print Generator Unit. This is the case during the actual printing of a photo or test images. |
| Actions | |
| Reset | A write to this register resets the MJI, stops any loading or printing processes, and loads all registers with 0. |
| SenseSegSelect | A write to this register with any value clears the FeedbackValid bit of the Status register, and the remaining action depends on the values in the LoadingDots and PrintingDots status bits. If either of the status bits are set, the Feedback bit is cleared and nothing more is done. If both status bits are clear, a pulse is given simultaneously on the SenseSegSelect line with all Cyan data bits 0. This stops any existing feedback. A pulse is then given on SenseSegSelect with the Cyan data bits set according to the SenseSegment register. Once the various sense lines have been tested, the values are placed in the Tsense, Vsense, Rsense, and Wsense registers, and the Feedback bit of the Status register is set. |
| Go | A write of 1 to this bit starts the LoadDots/PrintDots cycles, which commences with a wait for the first LineSync pulse. A total of NumLines lines are printed, each line being loaded/printed after the receipt of a LineSync pulse. The loading of each line consists of NumTransfers 12-bit transfers. As each line is printed, LinesRemaining decrements, and TransfersRemaining is reloaded with NumTransfers again. The status register contains print status information. Upon completion of NumLines, the loading/printing process stops, the Go bit is cleared, and any further LineSync pulses are ignored. During the final print cycle, nothing is loaded into the printhead. A write of 0 to this bit stops the print process, but does not clear any other registers. |

-continued

Memjet Interface Registers

| Register Name | Description |
|---|---|
| ClearCounts | A write to this register clears the CDotCount, MDotCount, and YDotCount, registers if bits 0, 1, or 2 respectively are set. Consequently a write of 0 has no effect. |
| Feedback | |
| Tsense | Read only feedback of Tsense from the last SenseSegSelect pulse sent to segment SenseSegment. Is only valid if the Feedback Valid bit of the Status register is set. |
| Vsense | Read only feedback of Vsense from the last SenseSegSelect pulse sent to segment SenseSegment. Is only valid if the FeedbackValid bit of the Status register is set. |
| Rsense | Read only feedback of Rsense from the last SenseSegSelect pulse sent to segment SenseSegment. Is only valid if the FeedbackValid bit of the Status register is set. |
| Wsense | Read only feedback of Wsense from the last SenseSegSelect pulse sent to segment SenseSegment. Is only valid if the FeedbackValid bit of the Status register is set. |
| CDotCount | Read only 24-bit count of cyan dots sent to the printhead. |
| MDotCount | Read only 24-bit count of magenta dots sent to the printhead. |
| YDotCount | Read only 24-bit count of yellow dots sent to the printhead. |

The MJI's Status Register is a 16-bit register with bit interpretations as follows:

MJI Status Register

| Name | Bits | Description |
|---|---|---|
| LoadingDots | 1 | If set, the MJI is currently loading dots, with the number of dots remaining to be transferred in TransfersRemaining. If clear, the MJI is not currently loading dots |
| PrintingDots | 1 | If set, the MJI is currently printing dots. If clear, the MJI is not currently printing dots. |
| PrintingA | 1 | This bit is set while there is a pulse on the AEnable line |
| PrintingB | 1 | This bit is set while there is a pulse on the BEnable line |
| FeedbackValid | 1 | This bit is set while the feedback values Tsense, Vsense, Rsense, and Wsense are valid |
| Reserved | 3 | — |
| PrintingChromapod | 4 | This holds the current chromapod being fired while the PrintingDots status bit is set. |
| PrintingNozzles | 4 | This holds the current nozzle being fired while the PrintingDots status bit is set. |

The following pseudocode illustrates the logic required to load a printhead for a single line. Note that loading commences only after the LineSync pulse arrives. This is to ensure the data for the line has been prepared by the PGU and is valid for the first transfer to the printhead.

```
Wait for LineSync
For TransfersRemaining = NumTransfers to 0
    If (SetAllNozzles)
        Set all ColorData lines to be 1
    Else
        Place 12 bit input on 12 ColorData lines
    EndIf
    Pulse SRClock
    Wait 12 cycles
    Send ADVANCE signal
EndFor
```

The Cleaning and Preheat cycles are accomplished by setting appropriate registers in the MJI:
SetAllNozzles=1
Set the PulseDuration register to either a low duration (in the case of the preheat mode) or to an appropriate drop ejection duration for cleaning mode.
Set NumLines to be the number of times the nozzles should be fired
Set the Go bit and then wait for the Go bit to be cleared when the print cycles have completed.

The LSGU must also be programmed to send LineSync pulses at the correct frequency.

Figure 19:
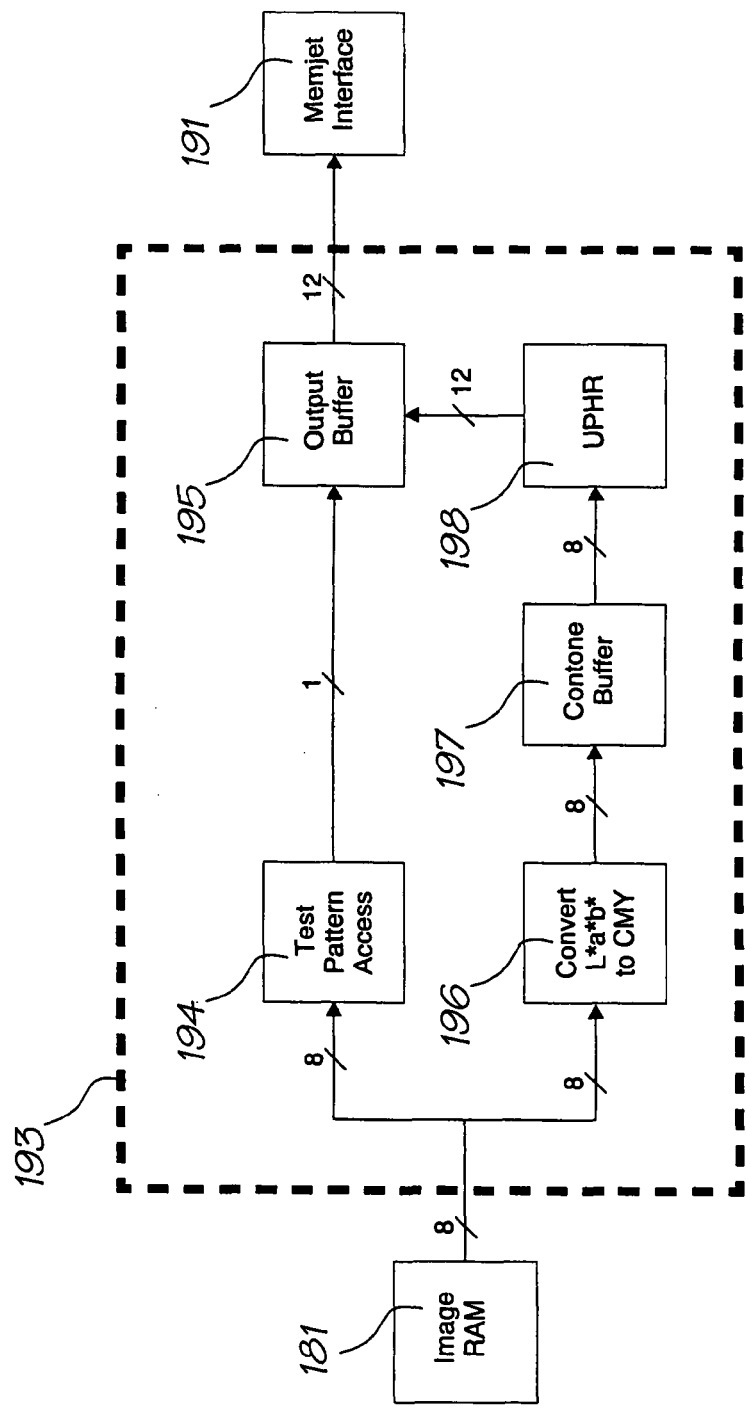
FIG. 19 is a schematic block diagram of a print generator unit.

From the simplest point of view, the PGU 193 provides the interface between the Image RAM 181 and the Memjet Interface 191. The elements of the PGU are shown schematically in FIG. 19. Two image processing chains are evident. The first, the Test Pattern mode, simply reads data directly from Image RAM 181, and formats in Test Pattern Access Unit (TPAU) 194 into output buffer 195 ready for output to the MJI 191. The second print chain contains the majority of functions required for printing an image. A conversion processor 196 converts L*a*b* format images to CMY format and stores the result in contone buffer 197. An Up-Interpolate, Halftone and Reformat for Printer Unit (UHRU) 198 massages the content of contone buffer 197 for the output buffer 195, and hence the Memjet interface 191. The PGU takes as input a variety of parameters, including L*a*b* to CMY conversion tables and printing timing parameters. The conversion processor 196 and the UHRU unit 198 run in parallel. The buffer sizes are shown in the following table.

Buffer sizes for Print Generator Unit

| Buffer | Size(bytes) | Composition of Buffer |
|---|---|---|
| Buffer 1 | 5 | 3 × 12 bits |
| Buffer 2 | 9,612 | 3 colors (CMY) × 6 lines × 534 contone pixels @ 8-bits each |

Apart from a number of registers, some of the processes have significant lookup tables or memory components. These are summarized in the following table.

Memory requirements within PGU Processes

| Unit | Size (bytes) | Composition of Requirements |
|---|---|---|
| Test Pattern Access | 0 | |
| Convert L*a*b* to CMY | 14,739 | 3 conversion tables, each 17 × 17 × 17 × 8-bits |
| UpInterpolate/Halftone/Reformat | 2,500 | Dither Cell, 50 × 50 × 8-bits |

The output buffer 195 holds the generated dots from the Print Generation process. It consists of a 12-bit shift register to hold dots generated one at a time from the UHRU 197, three 4-bit registers to hold the data generated from the TPAU 194, and a 12-bit register used as the buffer for data transfer to the MJI 191. A pulse on either the Advance line from the MJI, or the TransferWriteEnable from both the TPAU and the UHRU, loads the 12-bit Transfer register with all 12-bits, either from the three 4-bit registers or the single 12-bit shift register. The output buffer 195 therefore acts as a double buffering mechanism for the generated dots.

The contone buffer 197 holds six lines of the calculated CMY contone image. The contone buffer is generated by the conversion processor 196, and is accessed by the UHRU 198 in order to generate output dots for the printer.

The size of the Contone Buffer is dependent on the physical distance between the nozzles on the printhead. As dots for one color are being generated for one physical line, dots for a different color on a different line are being generated. The net effect is that six different physical lines are printed at the one time from the printer—odd and even dots from different output lines, and different lines per color.

Since the ratio of 534-res lines to 1600 dpi lines is 1:6, each contone pixel is sampled six times in each dimension. For the purposes of buffer lines, we are only concerned with 1 dimension, so only consider 6 dot lines coming from a single pixel line. The distance between nozzles of different colors is 4–8 dots (depending on Memjet parameters). We therefore assume 8, which gives a separation distance of 16 dots, or 17 dots in inclusive distance. The worst case scenario is that the 17 dot lines includes the last dot line from a given pixel line. This implies 5 pixel lines, with dot lines generated as 1, 5, 5, 5, 1, and allows an increase of nozzle separation to 10.

To ensure that the contone generation process writing to the buffer does not interfere with the dot generation process reading from the buffer, we add an extra line per color, for a total of six lines per color.

The contone buffer is therefore three colors of six lines, each line containing 534 8-bit contone values. The total memory required is 3×6×534=9,612 bytes (9.5 Kbytes). The memory only requires a single 8-bit read per cycle, and a single 8-bit write every 36 cycles (each contone pixel is read 36 times). The contone buffer can be implemented as single cycle double access (read and write) RAM running at the nominal speed of the printhead dot generation process. The contone buffer is set to white (all 0) before the start of the print process.

The Test Pattern Access process is the means by which test patterns are produced. Under normal user circumstances, this process will not be used. It is primarily for diagnostic purposes and is not described in detail. Persons skilled in the art will be aware of suitable processes for producing test patterns.

The operation of the conversion processor 196 to convert from L*a*b* to CMY is described in a co-pending application titled Color Conversion Method for Compact Printer System. The conversion is optional since the input data may already be in CMY format. In the latter case the data is simply passed through with no change.

The conversion is performed as tri-linear interpolation. Three 17×17×17 lookup tables are used for the conversion process: L*a*b* to Cyan, L*a*b* to Magenta, and L*a*b* to Yellow. However, since there are 36 cycles to perform each tri-linear interpolation, there is no need for a fast tri-linear interpolation unit. Instead, 8 calls to a linear interpolation process is more than adequate.

The input to the Up-interpolate, Halftone and Reformat Unit (UHRU) is the contone buffer 197 containing the partial CMY image. The output is a set of 12-bit values in the correct order to be sent to the Memjet Interface for subsequent output to the printhead via output buffer 195. The 12 output bits are generated 1 bit at a time, and sent to the 12-bit shift register in the output buffer.

The control of this process occurs from the Advance signal from the MJI and the LineSync0 pulse from the LSGU. When the UHRU starts up, and after each LineSync0 pulse, 12 bits are produced, and are clocked into the 12-bit shift register of output buffer 195. After the 12th bit has been clocked in, a TransferWriteEnable pulse is given to the output buffer and the next 12 bits are generated. After this, the UHRU waits for the Advance pulse from the MJI. When the Advance pulse arrives, the TransferWriteEnable pulse is given to the output buffer, and the next 12 bits are calculated before waiting again. In practice, once the first Advance pulse is given, synchronization has occurred and future Advance pulses will occur every 12 cycles thereafter.

Figure 20:
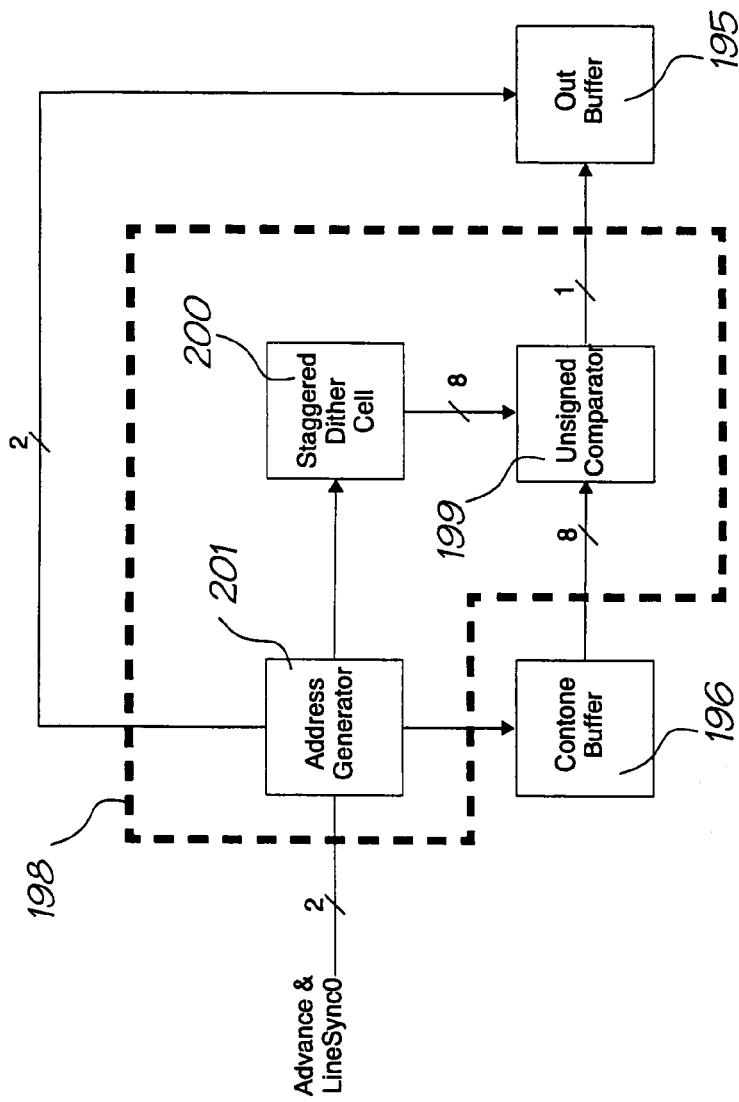
FIG. 20 is a schematic block diagram of an up-interpolate, halftone and reformat for printer unit.

The UpInterpolate, Halftone and Reformat process is shown schematically in FIG. 20.

The 534×850 CMY image is up-interpolated to the final print resolution (3200×5100). The ratio is 1:6 in both dimensions. Although it is certainly possible to bi-linearly interpolate the 36 values (1:6 in both X and Y dimensions), the resultant values will not be printed contone. The results will be dither and printed bi-level. Given that the contone 1600 dpi results will be converted into dither bi-level dots, the accuracy of bi-linear interpolation from 267 dpi to 1600 dpi will not be visible (the image resolution was chosen for this very reason). Pixel replication will therefore produce good results.

Pixel replication involves taking a single pixel, and using it as the value for a larger area. In this case, a single pixel is replicated to 36 pixels (a 6×6 block). If each pixel were contone, the result may appear blocky, but since the pixels are to be dither, the effect is that the 36 resultant bi-level dots take on the contone value.

The printhead is only capable of printing dots in a bi-level fashion. It is therefore necessary to convert from the contone CMY to a dither CMY image. More specifically, a dispersed dot ordered dither is produce using a stochastic dither cell 200, converting a contone CMY image into a dither bi-level CMY image.

The 8-bit 1600 dpi contone value is compared in unsigned comparator 199 to the current position in the dither cell. If the 8-bit contone value is greater than the dither cell value, an output bit of 1 is generated. Otherwise an output bit of 0 is generated. This output bit will eventually be sent to the printhead and control a single nozzle to produce a single C, M, or Y dot. The bit represents whether or not a particular nozzle will fire for a given color and position.

The same position in the dither cell can be used for C, M, and Y. This is because the actual printhead produces the C, M, and Y dots for different lines in the same print cycle. The staggering of the different colored dots effectively gives staggering in the dither cell.

The size of the dither cell depends on the resolution of the output dots. Since 1600 dpi dots are produced, the cell size should be larger than 32×32. In addition, to allow the dot processing order to match the printhead segments, the size of the dither cell should ideally divide evenly into 800 (since there are 800 dots in each segment of the printhead).

A dither cell size of 50×50 is large enough to produce high quality results, and divides evenly into 800 (16 times). Each entry of the dither cell is 8 bits, for a total of 2500 bytes (approximately 2.5 KB).

The final process before being sent to the printer is for the dots to be formatted into the correct order for being sent to the printhead. The dots must be sent to the printhead in the correct order—12 dots at a time for a 2 inch printhead.

The dots are produced in the correct order for printing by the up-interpolate and dither functions. Those dot values (each value is 1 bit) can simply be collected, and sent off in groups of 12. The 12 bit groups can then be sent to the printhead by the Memjet Interface 191.

In order to halftone 9,600 contone pixels, 9,600 contone pixels must be read in. The Address Generator Unit 201 performs this task, generating the addresses into the contone buffer, which effectively implements the UpInterpolate task. The Address Generator Unit also performs the reformatting task, as described above, and the addressing for the staggered dither cell 200.

The printhead interface 180 therefore performs the bulk of the image formatting tasks. The image stored in the image storage memory 181 is translated by the printhead interface 180 into a suitable format to drive the nozzles in the Memjet printhead 186. The CPU 171 is responsible for housekeeping and administration tasks to operate the printer module 10, but not the image formatting tasks.

Throughout the specification the aim has been to describe the preferred embodiments of the invention without limiting the invention to any one embodiment or specific collection of features. Persons skilled in the relevant art may realize variations from the specific embodiments that will nonetheless fall within the scope of the invention.

The invention claimed is:

1. A controller for a printer module having a stationary pagewidth printhead that prints dots defining an image on printable media, said controller comprising:
    a central processing unit;
    program memory associated with said central processing unit, said program memory storing program steps for execution by said central processing unit to operate said printer module to print said image;
    one or more interface units communicating with components of said printer module;
    image storage memory storing a said image in L*a*b* format;
    a pagewidth printhead interface for loading the pagewidth printhead with print data representing the dots to be printed; and
    an image access unit in communication with said image storage memory, said central processing unit and the printhead interface, said image access unit accessing said image in said image storage memory, and transferring said image to said printhead interface on command from said central processing unit;
    wherein said printhead interface includes a print generator, which converts said image from L*a*b* format to a dithered CMY format, for printing by a printhead.

2. The controller of claim 1 further comprising scratch memory associated with said central processing unit for variable storage.

3. The controller of claim 1 further comprising a serial bus interface communicating with a Serial Bus of a compact printer system including one or more further modules, said Serial Bus communicating power and data between said printer module and said one or more further modules.

4. The controller of claim 3 wherein said data includes image data stored in said image storage memory.

5. The controller of claim 1 wherein said central processing unit is a micro-controller running at about 1 Mhz.

6. The controller of claim 1 wherein at least one of said one or more interface units is a parallel interface unit communicating with at least a motor, said motor activating under control of said central processing unit to advance said printable media past said printhead.

7. The controller of claim 1 wherein said image storage memory is greater than 1 Mbytes.

8. The controller of claim 1 wherein said image storage memory is approximately 1.3 Mbytes.

9. The controller of claim 1 wherein said program memory is no greater than 8 Kbytes.

10. The controller of claim 2 wherein said scratch memory is no greater than 2 Kbytes.

11. The controller of claim 1 wherein said dithered CMY image has a resolution of 1600 dpi.

12. The controller of claim 1 wherein said printhead interface includes a synchronization generator unit that generates synchronization signals for transferring said image from said printhead interface to said printhead.

13. The controller of claim 12 wherein said synchronization generator unit generates signals for synchronization of a motor of said printer module.

14. The controller of claim 1 wherein at least one of said one or more interface units communicates with a QA chip of an ink cartridge.

15. The controller of claim 14 wherein two of said one or more interface units communicate with a pair of QA chips, one said QA chip being said QA chip of said ink cartridge and the other said QA chip being an associated QA chip, said QA chips cooperating to authenticate said ink cartridge for said printer module.

16. The controller of claim 1 wherein said controller is an application specific integrated circuit.

* * * * *